(12) United States Patent
Haynes, III et al.

(10) Patent No.: US 8,543,442 B2
(45) Date of Patent: Sep. 24, 2013

(54) COMMERCIAL INVESTMENT ANALYSIS

(75) Inventors: James M. Haynes, III, San Francisco, CA (US); Anthony W. Ulwick, Mill Valley, CA (US)

(73) Assignee: Strategyn Holdings, LLC, Boynton Beach, FL (US)

( * ) Notice: Subject to any disclaimer, the term of this patent is extended or adjusted under 35 U.S.C. 154(b) by 0 days.

(21) Appl. No.: 13/533,689

(22) Filed: Jun. 26, 2012

(65) Prior Publication Data

US 2012/0323629 A1 Dec. 20, 2012

Related U.S. Application Data

(63) Continuation of application No. 12/476,160, filed on Jun. 1, 2009, now Pat. No. 8,214,244.

(60) Provisional application No. 61/057,806, filed on May 30, 2008.

(51) Int. Cl.
*G06Q 40/00* (2012.01)

(52) U.S. Cl.
USPC .......... 705/7.25; 705/35; 705/7.12; 705/7.23; 705/7.29; 705/7.31; 705/7.37

(58) Field of Classification Search
None
See application file for complete search history.

(56) References Cited

U.S. PATENT DOCUMENTS

| | | |
|---|---|---|
| 4,885,685 A | 12/1989 | Wolfberg et al. |
| 4,894,773 A | 1/1990 | Lagarias |
| 4,924,386 A | 5/1990 | Freedman et al. |
| 4,992,940 A | 2/1991 | Dworkin |
| 4,996,642 A | 2/1991 | Hey |
| 5,009,626 A | 4/1991 | Katz |
| 5,041,972 A | 8/1991 | Frost |
| 5,111,392 A | 5/1992 | Malin |
| 5,122,952 A | 6/1992 | Minkus |
| 5,124,911 A | 6/1992 | Sack |
| 5,164,897 A | 11/1992 | Clark et al. |
| 5,182,793 A | 1/1993 | Alexander et al. |
| 5,200,909 A | 4/1993 | Juergens |
| 5,251,294 A * | 10/1993 | Abelow ........................ 715/236 |
| 5,267,146 A | 11/1993 | Shimizu et al. |
| 5,297,054 A | 3/1994 | Kienzle et al. |
| 5,299,115 A | 3/1994 | Fields et al. |

(Continued)

FOREIGN PATENT DOCUMENTS

| | | |
|---|---|---|
| EP | 0210742 | 2/1987 |
| FR | 2752934 | 3/1998 |

OTHER PUBLICATIONS

Auchey, Flynn L. et al., "Using PRISM to Quantify Qualitative Data," AACE International Transactions, pp. RI11-RI17, 2006.

(Continued)

*Primary Examiner* — Gregory Johnson
(74) *Attorney, Agent, or Firm* — Sheppard, Mullin, Richter & Hampton LLP

(57) ABSTRACT

A technique for performing commercial venture analysis involves establishing an empirically-derived structure and evaluating companies using analytical techniques within that structure. The technique may involve defining jobs, or goals a customer is attempting to reach, with dozens or even hundreds of outcomes. Ideally, the structure and tools facilitate analysis that would not be possible otherwise. Moreover, the nature of the system enables real-time input for changing conditions and the ability to calculate returns for new markets in which products or services do not exist.

15 Claims, 6 Drawing Sheets

(56) References Cited

U.S. PATENT DOCUMENTS

| | | | |
|---|---|---|---|
| 5,317,503 A | 5/1994 | Inoue | |
| 5,319,541 A | 6/1994 | Blanchard et al. | |
| 5,351,186 A | 9/1994 | Bullock et al. | |
| 5,416,694 A | 5/1995 | Parrish et al. | |
| 5,432,904 A | 7/1995 | Wong | |
| 5,634,021 A | 5/1997 | Rosenberg et al. | |
| 5,734,890 A | 3/1998 | Case et al. | |
| 5,842,193 A * | 11/1998 | Reilly | 706/45 |
| 5,963,910 A | 10/1999 | Ulwick | |
| 6,085,165 A | 7/2000 | Ulwick | |
| 6,115,691 A | 9/2000 | Ulwick | |
| 6,240,411 B1 | 5/2001 | Thearling | |
| 6,526,387 B1 | 2/2003 | Ruffin et al. | |
| 6,708,155 B1 | 3/2004 | Honarvar et al. | |
| 6,961,756 B1 | 11/2005 | Dilsaver et al. | |
| 7,039,654 B1 | 5/2006 | Eder | |
| 7,146,359 B2 | 12/2006 | Castellanos | |
| 7,340,409 B1 | 3/2008 | Ulwick | |
| 7,533,035 B1 | 5/2009 | Abend et al. | |
| 7,664,670 B1 | 2/2010 | Weiss | |
| 7,689,540 B2 | 3/2010 | Chowdhury et al. | |
| 7,761,427 B2 | 7/2010 | Martin et al. | |
| 7,844,594 B1 | 11/2010 | Holt et al. | |
| 7,904,451 B2 | 3/2011 | Cobb et al. | |
| 7,970,786 B2 | 6/2011 | Bahrami et al. | |
| 8,176,084 B2 | 5/2012 | Chowdhury | |
| 8,190,627 B2 | 5/2012 | Platt et al. | |
| 8,214,238 B1 | 7/2012 | Fairfield et al. | |
| 2002/0016727 A1 | 2/2002 | Harrell et al. | |
| 2002/0049621 A1 | 4/2002 | Bruce | |
| 2002/0099582 A1 | 7/2002 | Buckley et al. | |
| 2002/0120459 A1 | 8/2002 | Dick et al. | |
| 2002/0173998 A1 | 11/2002 | Case | |
| 2003/0033040 A1* | 2/2003 | Billings | 700/97 |
| 2003/0033191 A1 | 2/2003 | Davies et al. | |
| 2003/0033192 A1 | 2/2003 | Zyman et al. | |
| 2003/0036947 A1* | 2/2003 | Smith et al. | 705/10 |
| 2003/0083914 A1 | 5/2003 | Marvin et al. | |
| 2003/0110067 A1 | 6/2003 | Miller et al. | |
| 2003/0115094 A1 | 6/2003 | Ammerman et al. | |
| 2003/0135399 A1 | 7/2003 | Ahamparam et al. | |
| 2003/0139828 A1 | 7/2003 | Ferguson et al. | |
| 2003/0187707 A1 | 10/2003 | Hack et al. | |
| 2004/0093244 A1 | 5/2004 | Hatcher et al. | |
| 2004/0117234 A1 | 6/2004 | Lindsay-Scott et al. | |
| 2004/0143470 A1 | 7/2004 | Myrick et al. | |
| 2004/0193476 A1 | 9/2004 | Aerdts | |
| 2004/0204980 A1 | 10/2004 | Swedberg et al. | |
| 2004/0230397 A1 | 11/2004 | Chadwick | |
| 2004/0230464 A1 | 11/2004 | Bliss et al. | |
| 2004/0236621 A1 | 11/2004 | Eder | |
| 2005/0026119 A1 | 2/2005 | Ellis et al. | |
| 2005/0096950 A1 | 5/2005 | Caplan et al. | |
| 2005/0114829 A1 | 5/2005 | Robin et al. | |
| 2005/0228824 A1 | 10/2005 | Gattuso et al. | |
| 2005/0240511 A1* | 10/2005 | Chadwick et al. | 705/37 |
| 2006/0080326 A1 | 4/2006 | Akbay et al. | |
| 2006/0085255 A1 | 4/2006 | Hastings et al. | |
| 2006/0149764 A1 | 7/2006 | Burchfield et al. | |
| 2006/0200423 A1 | 9/2006 | Powell | |
| 2006/0206374 A1 | 9/2006 | Asthana et al. | |
| 2006/0277156 A1 | 12/2006 | Merican | |
| 2006/0287937 A1* | 12/2006 | Flinn et al. | 705/35 |
| 2007/0038501 A1 | 2/2007 | Lee et al. | |
| 2007/0038627 A1* | 2/2007 | Cohn et al. | 707/8 |
| 2007/0050198 A1 | 3/2007 | Ledford et al. | |
| 2007/0078692 A1 | 4/2007 | Vyas | |
| 2007/0083385 A1 | 4/2007 | Patterson et al. | |
| 2007/0083421 A1 | 4/2007 | McNair et al. | |
| 2007/0106520 A1 | 5/2007 | Akkiraju et al. | |
| 2007/0129981 A1 | 6/2007 | Jang et al. | |
| 2007/0156382 A1 | 7/2007 | Graham et al. | |
| 2007/0162316 A1 | 7/2007 | Kratschmer et al. | |
| 2007/0179833 A1 | 8/2007 | Moorthy et al. | |
| 2007/0282666 A1 | 12/2007 | Afeyan et al. | |
| 2007/0282667 A1 | 12/2007 | Cereghini et al. | |
| 2008/0021844 A1 | 1/2008 | Sanwal et al. | |
| 2008/0114608 A1 | 5/2008 | Bastien | |
| 2008/0114628 A1 | 5/2008 | Johnson et al. | |
| 2008/0133316 A1 | 6/2008 | Sarkar | |
| 2008/0167936 A1 | 7/2008 | Kapoor | |
| 2008/0205692 A1 | 8/2008 | Hinkle et al. | |
| 2008/0208648 A1 | 8/2008 | Linder et al. | |
| 2008/0249825 A1 | 10/2008 | Kunjur et al. | |
| 2008/0256069 A1 | 10/2008 | Eder | |
| 2008/0294534 A1 | 11/2008 | Brown et al. | |
| 2008/0312980 A1 | 12/2008 | Boulineau et al. | |
| 2008/0313596 A1 | 12/2008 | Kreamer et al. | |
| 2008/0319811 A1 | 12/2008 | Casey | |
| 2008/0319958 A1 | 12/2008 | Bhattacharya et al. | |
| 2009/0018891 A1 | 1/2009 | Eder | |
| 2009/0070160 A1 | 3/2009 | Kasravi et al. | |
| 2009/0112686 A1 | 4/2009 | Sheehan et al. | |
| 2009/0138322 A1 | 5/2009 | Joyner et al. | |
| 2009/0144127 A1* | 6/2009 | Smith | 705/10 |
| 2009/0157569 A1 | 6/2009 | Henby et al. | |
| 2009/0259521 A1 | 10/2009 | Yitts | |
| 2010/0070348 A1 | 3/2010 | Nag | |
| 2010/0125475 A1 | 5/2010 | Twyman | |
| 2010/0125566 A1 | 5/2010 | Gibbs et al. | |
| 2010/0145951 A1 | 6/2010 | Van Coeverden De Groot et al. | |
| 2010/0179951 A1 | 7/2010 | McPhail | |
| 2011/0029514 A1 | 2/2011 | Kerschberg et al. | |
| 2011/0040750 A1 | 2/2011 | Safra et al. | |
| 2011/0087698 A1 | 4/2011 | Iguchi | |
| 2011/0161054 A1 | 6/2011 | Woolf et al. | |
| 2012/0158450 A1* | 6/2012 | Ulwick et al. | 705/7.25 |

OTHER PUBLICATIONS

Campion, Michael A. et al., "Neglected Questions in Job Design: How People Design Jobs, Task-Job Predictabillity, and Influence of Training," Journal of Business and Psychology, vol. 6, No. 2, pp. 169-191, Winter 1991.

Chesbrough, "Open Innovation, The New Imperative for Creating and Profiting from Technology", Harvard Business School Press, 2003.

Davis et al., "Edison in the Boardroom, How Leading Companies Realize Value from Their Intellectual Assets", John Wiley & Sons, 2001.

Fuelling, "Manufacturing, Selling and Accounting: Patenting Business Methods", 76 Journal of the Patent and Trademark Office Society, Jul. 1994, pp. 471-507.

GartnerGroup Executive Services, "Executive Market Analysis Program, Today's Market Program demands Better Analysis", pp. 11-36 (first provided to clients in Nov. 1993).

Harrison et al., "Edison in the Boardroom. Moving Beyond Intellectual Capital to I-Stuff", John Wiley & Sons, Inc., 2006.

Kaeli, James K., "A Company-Wide Perspective to Identify, Evaluate and Rank the Potential for CIM (Computer Integrated Manufacturing)," Industrial Engineering, vol. 22, No. 7, pp. 23-26, Jul. 1990.

Lyman et al., "Deployment Normalization", International TechneGroup Incorporation, 1990, pp. 1-7.

Saaty, "Decision Making for Leaders", pp. 1-33, 1988.

Strategyn, Inc., "CD-MAP®, An Advanced Technology for Strategy Formulation", 1998, pp. 1-37.

Strategyn, Inc., "Sample Project Reports, Presenting the Results of a CD-MAP®, XYZ Company, CD-MAP® Project Final Report, Formulating a Strategy to Improve the Product Development Process", pp. 1-26 and "XYZ Company, CD-MAP® Project Final Report, Evaluating the Attractiveness of Alternative Market Segments", 1998, pp. 1-23.

Ulwick, "The Intellectual Revolution, Applying Advanced Technology to Strategy Formulation, Planning and Decision Marking", Strategyn, Inc., Manuscript Version 030698, 1997, pp. 1-166.

Ulwick, "Turn Customer Input into Innovation", Harvard Business Review, Jan. 2002, pp. 5-11.

Vincze, "Expert Choice", pp. 10-12, Mar. 1990.

Von Hippel, "Democratizing Innovation", MIT Press, Apr. 2005.

Search Report and Written Opinion mailed Sep. 28, 2010 from International Serial No. PCT/US2010/026858 filed Mar. 10, 2010.

Co-pending U.S. Appl. No. 08/716,948, filed Sep. 20, 1996.
Co-pending U.S. Appl. No. 08/763,668, filed Dec. 11, 1996.
Co-pending U.S. Appl. No. 09/385,661, filed Aug. 27, 1999.
Co-pending U.S. Appl. No. 09/652,576, filed Aug. 31, 2000.
Co-pending U.S. Appl. No. 10/235,285, filed Sep. 5, 2002.
Co-pending U.S. Appl. No. 12/253,433, filed Oct. 17, 2008.
Co-pending U.S. Appl. No. 12/476,160, filed Jun. 1, 2009.
Co-pending U.S. Appl. No. 12/563,969, filed Sep. 21, 2009.
Co-pending U.S. Appl. No. 12/592,715, filed Nov. 30, 2009.
Co-pending U.S. Appl. No. 12/800,652, filed May 18, 2010.
Co-pending U.S. Appl. No. 13/319,066, filed Nov. 4, 2011.
Advisory Action Mailed Nov. 30, 2005 in Co-pending U.S. Appl. No. 09/652,576, filed Aug. 31, 2000.
Co-pending U.S. Appl. No. 13/020,546, filed Feb. 3, 2011.
Final Office Action mailed Jul. 2, 2012 in U.S. Appl. No. 12/592,715, filed Nov. 30, 2009.
Final Office Action Mailed Jul. 27, 2006 in Co-pending U.S. Appl. No. 09/652,576, filed Aug. 31, 2000.
Final Office Action Mailed May 28, 2009 in Co-pending U.S. Appl. No. 10/235,285, filed Sep. 5, 2002.
Non-Final Office Action mailed Oct. 7, 2011 from U.S. Appl. No. 12/253,433, filed Oct. 17, 2008.
Non-Final Office Action mailed Dec. 20, 2011 from U.S. Appl. No. 12/592,715, filed Nov. 30, 2009.
Non-Final Office Action Mailed Apr. 4, 2008 in Co-pending U.S. Appl. No. 10/235,285, filed Sep. 5, 2002.
Non-Final Office Action Mailed Jul. 26, 2004 in Co-pending U.S. Appl. No. 09/652,576, filed Aug. 31, 2000.
Non-Final Office Action Mailed Mar. 14, 2006 in Co-pending U.S. Appl. No. 09/652,576, filed Aug. 31, 2000.
Non-Final Office Action mailed May 10, 2012 in U.S. Appl. No. 12/563,969, filed Sep. 21, 2009.
Non-Final Office Action Mailed Sep. 16, 1998 in Co-pending U.S. Appl. No. 08/763,668, filed Dec. 11, 1996.
Non-Final Office Action Mailed Sep. 17, 1998 in Co-pending U.S. Appl. No. 08/716,948, filed Sep. 20, 1996.
Non-Final Office Action Mailed Nov. 16, 2011 in U.S. Appl. No. 12/476,160, filed Jun. 1, 2009.
Notice of Allowance mailed Apr. 19, 2012 in U.S. Appl. No. 12/476,160, filed Jun. 1, 2009.
Notice of Allowance Mailed Mar. 1, 1999 in Co-pending U.S. Appl. No. 08/716,948, filed Sep. 20, 1996.
Notice of Allowance Mailed Mar. 1, 1999 in Co-pending U.S. Appl. No. 08/763,668, filed Dec. 11, 1996.
Notice of Allowance Mailed Mar. 27, 2000 in Co-pending U.S. Appl. No. 09/385,661, filed Aug. 27, 1999.
Notice of Allowance Mailed Oct. 11, 2007 in Co-pending U.S. Appl. No. 09/652,576, filed Aug. 31, 2000.
Non-Final Office Action mailed Aug. 23, 2012 in U.S. Appl. No. 12/800,652, filed May 18, 2010.
Non-Final Office Action mailed Sep. 28, 2012 in U.S. Appl. No. 13/020,546, filed Feb. 3, 2011.
European Patent Application No. 10751374.9, Search Report mailed May 2, 2013.

\* cited by examiner

| Outcome Statement | Importance | Satisfaction | Opportunity | Weighted Opportunity | Value Score | New Concept Satisfaction | New Concept Value Score |
|---|---|---|---|---|---|---|---|
| Outcome Statement | 8.8 | 4.4 | 13.2 | 10.0% | 4.4 | 5.0 | 5.0 |
| Outcome Statement | 8.9 | 5.4 | 12.4 | 12.3% | 6.6 | 7.4 | 9.1 |
| Outcome Statement | 9.0 | 6.0 | 12.0 | 13.6% | 8.2 | 6.1 | 8.3 |
| Outcome Statement | 6.3 | 2.5 | 10.1 | 5.7% | 1.4 | 2.7 | 1.5 |
| Outcome Statement | 7.2 | 5.8 | 8.6 | 13.2% | 7.6 | 4.7 | 6.2 |
| Outcome Statement | 6.6 | 4.9 | 8.3 | 11.1% | 5.5 | 6.0 | 6.7 |
| Outcome Statement | 6.3 | 6.5 | 6.3 | 14.8% | 9.6 | 7.1 | 10.5 |
| Outcome Statement | 4.3 | 3.3 | 5.3 | 7.5% | 2.5 | 3.4 | 2.6 |
| Outcome Statement | 4.4 | 5.2 | 4.4 | 11.8% | 6.1 | 5.5 | 6.5 |
| | | 44 | | 100.0% | 51.9545455 | | 56.35 |

| Size 602 | |
| Material 604 | |
| Weight 606 | |
| Interconnectivity 608 | |
| Functionality 610 | Score 620 |
| Rate 612 | |
| Resources 614 | |
| Standardization 616 | |
| Life Cycle 618 | |

FIG. 6

COMMERCIAL INVESTMENT ANALYSIS

CROSS-REFERENCE TO RELATED APPLICATIONS

This application is a continuation of U.S. Ser. No. 12/476,160, filed Jun. 1, 2009 now U.S. Pat. No. 8,214,244, entitled "COMMERCIAL INVESTMENT ANALYSIS," which claims priority to U.S. Provisional Patent Application No. 61/057,806, filed May 30, 2008, entitled "COMMERCIAL INVESTMENT ANALYSIS," both of which are incorporated herein by reference in their entireties.

BACKGROUND

Almost all new products fail; in fact, according to Harvard Business Review, Jul. 1, 2004, 90% of all new products fail. This makes investment in early stage companies a gamble. Moreover, early-stage investment is highly inefficient because investment is diluted over time.

The foregoing examples of the related art and limitations related therewith are intended to be illustrative and not exclusive. Other limitations of the related art will become apparent upon a reading of the specification and a study of the drawings.

SUMMARY

In various examples, one or more of the above-described problems have been reduced or eliminated, while other examples are directed to other improvements. The following examples and aspects thereof are described and illustrated in conjunction with systems, tools, and methods that are meant to be exemplary and illustrative, not limiting in scope.

A technique for performing commercial venture analysis involves establishing an empirically-derived structure and evaluating companies using analytical techniques within that structure. The technique may involve defining jobs, or goals a customer is attempting to reach, with dozens or even hundreds of outcomes. Ideally, the structure and tools facilitate analysis that would not be possible otherwise. Moreover, the nature of the system enables real-time input for changing conditions and the ability to calculate returns for new markets in which products or services do not exist.

BRIEF DESCRIPTION OF THE DRAWINGS

FIG. 3 is intended to illustrate an example of a value add proposition for several outcome statements using techniques described with reference to FIGS. 1 and 2.

FIG. 6 depicts an example of a platform data structure.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
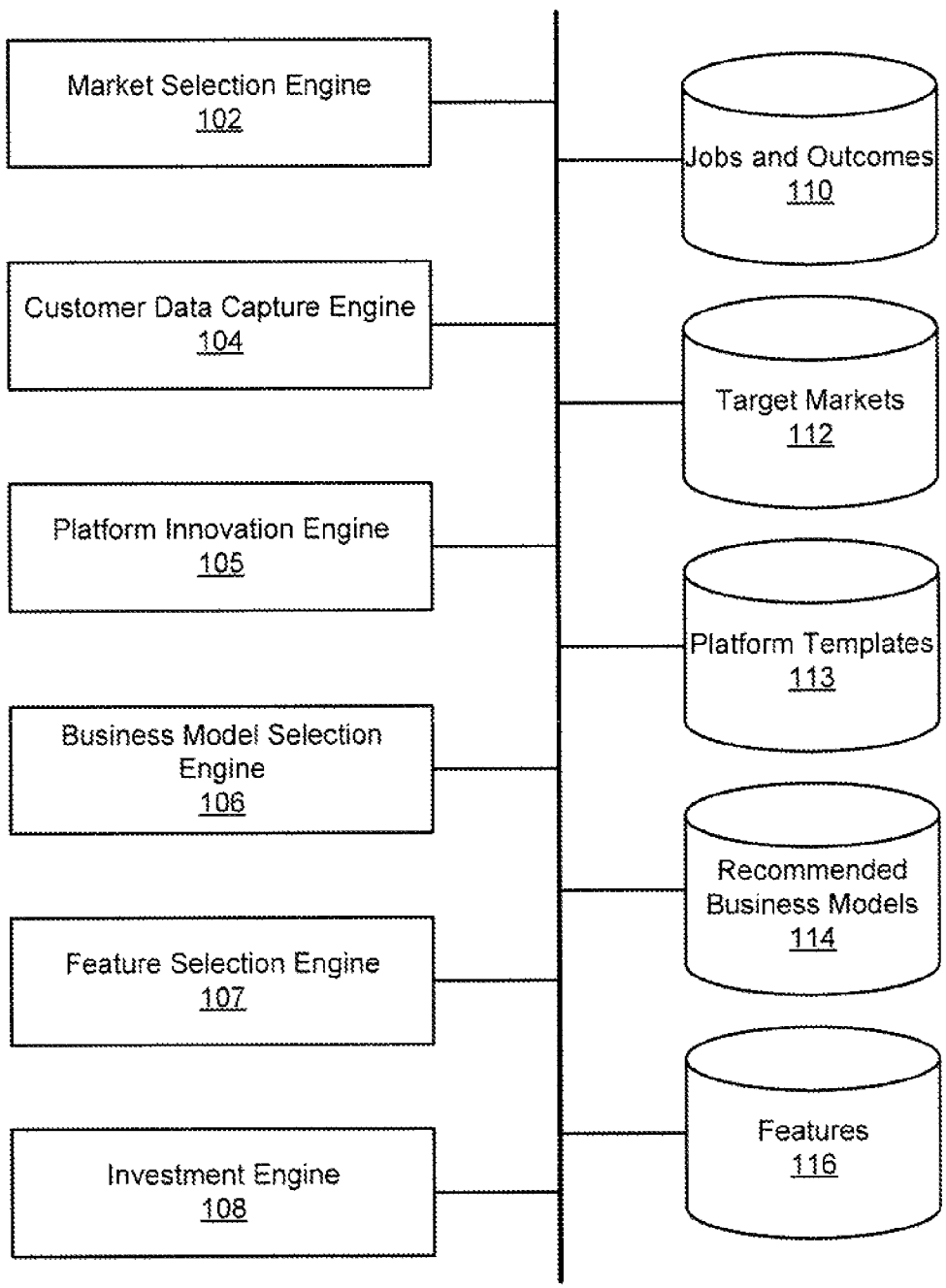
FIG. 1 depicts an example of a system for making investment decisions.

FIG. 1 depicts an example of an MIS system 100. The MIS system 100 includes a market selection engine 102, a customer data capture engine 104, a platform innovation engine 105, a business model selection engine 106, a feature selection engine 107, an investment engine 108, a jobs and outcomes database 110, a target market database 112, a platform templates database 113, a recommended business models database 114, and features database 116.

The market selection engine 102 can consider data from the jobs and outcomes database 110. Table 1 includes examples of data potentially useful in selecting a market that may be extracted from the jobs and outcomes database 110.

TABLE 1

| | | Market Evaluation Criteria | | | |
|---|---|---|---|---|---|
| Categories | Category Weights | Market Selection Criteria | Threshold Value | Criteria Importance | Overall Weights |
| Assess the revenue potential | 20 | 1. Revenue potential in the market in 3 years<br>— Amount of money prospects are willing to spend to get the job done perfectly each time<br>— Number of times per year prospects spend money trying to get the job done<br>— Number of prospects in the stated demographic currently trying to perform the job<br>— Number of prospects in other demographics currently trying to perform the job | $0 | 100 | 20.0 |

TABLE 1-continued

| Categories | Category Weights | Market Selection Criteria | Threshold Value | Criteria Importance | Overall Weights |
|---|---|---|---|---|---|
| Assess the degree to which the customer needs are underserved | 17 | — Projected year-to-year increase in the number of prospects trying to perform the job (3 year average growth rate) | | | |
| | | 2. Percent of prospects performing the job who say their ability to get the job done is underserved | 0% | 50 | 8.5 |
| | | 3. Percent of prospects performing the job who say their ability to get related consumption jobs done is underserved, e.g., acquiring the product/services, learning how to use, customization, etc. | 0% | 50 | 8.5 |
| | | — Percent of prospects performing the job who say current methods for acquiring the product/service are underserved, e.g., become aware, choose, purchase, etc. | 0% | 0 | 0.0 |
| | | — Percent of prospects performing the job who say current methods for learning how to use the product/service are underserved | 0% | 0 | 0.0 |
| | | — Percent of prospects performing the job who say current methods for product/service customization are underserved | 0% | 0 | 0.0 |
| | | — Percent of prospects performing the job who say current methods for setting the product/service up are underserved, e.g., preparing it for operation, getting it to work, etc. | 0% | 0 | 0.0 |
| | | — Percent of prospects performing the job who say current methods for moving customized features to a replacement product/service are underserved, e.g., settings, preferences, passwords, etc. | 0% | 0 | 0.0 |
| | | — Percent of prospects performing the job who say current methods for interacting with the product/service are underserved | 0% | 0 | 0.0 |
| | | — Percent of prospects performing the job who say current methods for upkeep of the product/service are underserved | 0% | 0 | 0.0 |
| | | — Percent of prospects performing the job who say the aesthetics of the | 0% | 0 | 0.0 |

TABLE 1-continued

Market Evaluation Criteria

| Categories | Category Weights | Market Selection Criteria | Threshold Value | Criteria Importance | Overall Weights |
|---|---|---|---|---|---|
| | | product are underserved, e.g., look and feel, fit and finish, etc. | | | |
| | | — Percent of prospects performing the job who say current methods for unpacking the product are underserved, e.g., getting product out of the box, disposing of packaging, etc. | 0% | 0 | 0.0 |
| | | — Percent of prospects performing the job who say current methods for installing the product are underserved | 0% | 0 | 0.0 |
| | | — Percent of prospects performing the job who say current methods for storing the product are underserved | 0% | 0 | 0.0 |
| | | — Percent of prospects performing the job who say current methods for disposing of the product are underserved | 0% | 0 | 0.0 |
| Assess the cost of getting the job done | 18 | 4. Percent of prospects performing the job who say the cost of getting the job done is excessive | 0% | 50 | 9.0 |
| | | 5. Percent of prospects performing the job who say the cost of getting related consumption jobs done is excessive | 0% | 50 | 9.0 |
| | | — Percent of prospects performing the job who say the cost of labor to execute the job is excessive, e.g., cost of operators, support staff, etc. | 0% | 0 | 0.0 |
| | | — Percent of prospects performing the job who say the cost of operating the product/service is excessive, e.g., cost of consumables, supplies, power, etc. | 0% | 0 | 0.0 |
| | | — Percent of prospects performing the job who say the cost of shopping for the product/service is excessive, e.g., finding, researching, comparing, etc. | 0% | 0 | 0.0 |
| | | — Percent of prospects performing the job who say the cost of acquisition is excessive, e.g., product/service purchase price, price of required accessories, etc. | 0% | 0 | 0.0 |
| | | — Percent of prospects performing the job who say the cost of installing the product/service is excessive | 0% | 0 | 0.0 |

TABLE 1-continued

Market Evaluation Criteria

| Categories | Category Weights | Market Selection Criteria | Threshold Value | Criteria Importance | Overall Weights |
|---|---|---|---|---|---|
| | | — Percent of prospects performing the job who say the cost of setting up the product/service is excessive | 0% | 0 | 0.0 |
| | | — Percent of prospects performing the job who say the cost of learning how to use the product/service is excessive | 0% | 0 | 0.0 |
| | | — Percent of prospects performing the job who say the cost of customizing the product/service is excessive | 0% | 0 | 0.0 |
| | | — Percent of prospects performing the job who say the cost of upkeep for the product/service is excessive, e.g., maintaining, repairing, etc. | 0% | 0 | 0.0 |
| | | — Percent of prospects performing the job who say the cost of storing the product is excessive | 0% | 0 | 0.0 |
| | | — Percent of prospects performing the job who say the cost of disposing the product is excessive | 0% | 0 | 0.0 |
| Assess the organization's ability to create a valued solution | 15 | 6. Degree of experience the team has in the market, e.g., with the job of interest, with the stated demographic, etc. | 0% | 34 | 5.1 |
| | | 7. Degree to which the organization's value-creating processes can be applied in the market, e.g., ability to manufacture, distribute, sell, etc. | 0% | 33 | 5.0 |
| | | 8. Probability that the organization can overcome competitive barriers to entry, e.g., capital entry requirements, customer brand loyalty, intellectual property rights, etc. | 0% | 33 | 5.0 |
| Assess the organization's ability to sustain a market leadership position | 15 | 9. Probability of being a market leader* in the long-term, e.g., being number one, two, three, etc. | 0% | 20 | 3.0 |
| | | 10. Probability that ownership/license opportunities for intellectual property exist, e.g., patents, trademarks, etc. | 0% | 20 | 3.0 |
| | | 11. Degree to which the organization's value-creating processes cannot be duplicated by other organizations | 0% | 20 | 3.0 |
| | | 12. Probability that the organization can | 0% | 20 | 3.0 |

TABLE 1-continued

Market Evaluation Criteria

| Categories | Category Weights | Market Selection Criteria | Threshold Value | Criteria Importance | Overall Weights |
|---|---|---|---|---|---|
| | | maintain competitive barriers to entry, e.g., capital entry requirements, customer brand loyalty, intellectual property rights, etc. | | | |
| | | 13. Probability that competitors will be slow to respond to a new market entrant | 0% | 20 | 3.0 |
| Assess the risk to the organization of market entry | 15 | 14. Probability that market entry will not result in exposure to legal liabilities | 0% | 17 | 2.6 |
| | | 15. Probability that market entry will not damage relationships with other organizations, e.g., business partners, suppliers, government, etc. | 0% | 17 | 2.6 |
| | | 16. Probability that market entry will not damage the company's public image | 0% | 17 | 2.6 |
| | | 17. Probability that market entry will not cannibalize* existing company revenues | 0% | 17 | 2.6 |
| | | 18. Probability that the company will be able to comply with market regulations, e.g., those imposed by government, trade organizations, consumer advocacy groups, etc. | 0% | 16 | 2.4 |
| | | 19. Percent of prospects who direct/influence the money/budget to buy solutions to get the job done | 0% | 16 | 2.4 |
| Other | 0 | 20. | 0% | 20 | 0.0 |
| | | 21. | 0% | 20 | 0.0 |
| | | 22. | 0% | 20 | 0.0 |
| | | 23. | 0% | 20 | 0.0 |
| | | 24. | 0% | 20 | 0.0 |

In the example of Table 1, category weights may have default values stored in the job database, and/or may be applied on the fly based upon an analysis of the available data. For example, data may be weighted differently based upon trustworthiness of the data. Trustworthiness may be determined based upon, by way of example but not limitation, an indicated source of the data, the age of the data, etc. Threshold values may be calculated using data in the jobs and outcomes database 110 or other data that is useful for the analysis. Criteria importance indicates a weight ratio between criteria of a category.

The market selection engine 102 analyzes the relevant data in the jobs and outcomes database 110 to determine the size of a market. Advantageously, the market selection engine 102 can be running to continuously identify markets using potentially changing data points. As data points change, the engine will calculate the most attractive markets for investment. Since the market is, as used in this paper, a job and the job executor, it is possible to identify markets for investment that do not even exist. Sequencing DNA, when it was new, was a job, but there were not tools to do it. At the time, the new market could have been identified even though there were no products or services to sequence DNA. As another example, the market for finding one's car was a zero-dollar solution (write parking space on a piece of paper) until a solution (use GPS) was provided. For illustrative purposes, the largest markets identified are stored in the target market database 112, which can be updated in real-time.

It may be desirable to augment the jobs and outcomes database 110 after consulting the target market database 112. For example, after a target market is identified, it may be advantageous to identify customers in a customer chain who may potentially be involved with any aspect of the job (e.g., raw material provider, parts supplier, manufacturer, OEM, distributor, retailer, service provider, purchase decision-maker, job executer, job beneficiary, and education/training), particularly those customers that are most likely to be unsatisfied and/or on whom you are dependent for success.

The customer data capture engine 104 considers markets in the target market database 112, and captures desired outcomes for relevant jobs. The customer data capture engine 104 can consider a market (a job), the number of job executors and their various outcomes, and the willingness of job executors to pay for a new solution. A target market can be defined as a dollar estimate that is related to the number of job executors times the number of job executors willing to pay. The customer data capture engine 104 can use a job map for each job to assist in the analysis required to identify outcomes. The customer data capture engine 104 can also perform or prompt for quantitative market research to capture importance and satisfaction levels customers place on each outcome. This can improve the quality of the results obtained by the business model selection engine 106. Advantageously, since the The platform innovation engine 105 improves upon a value delivery platform template from the platform templates database 113. The platform templates database 113 can include old templates from other platforms. For simplicity, it is assumed that if a template is provided by a human to the platform innovation engine 105, it is part of the platform templates database 113, as well. Thus, the platform innovation engine 105 is referred to as obtaining the template from the database. The template includes parameters associated with various components of a platform that is responsive to a particular job.

The business model selection engine 106 analyzes the relevant data in the jobs and outcomes database 110, the target market in the target markets database 112, and the platform from the platform templates database 113, to recommend a business model. This can include identifying where a market is under- and over-served and/or identifying segments of opportunity if opportunities are not present in the broad market. The business model selection engine 106 can calculate cost target ranges, as well as timing targets using individual and portfolio factors.

It may be advantageous to consider three types of criteria when selecting a value delivery platform: Customer, Company, and Society. Tables 2, 3, and 4 include examples from these three categories of data potentially useful in selecting a value delivery platform that may be extracted from the jobs and outcomes database 110.

TABLE 2

Value Delivery Platform Customer Criteria

| Platform Selection - Customer Criteria | Criteria Importance | Threshold Value |
|---|---|---|
| 1. Customer's level of satisfaction in getting the job done | 6 | 0% |
| 2. Customer's level of satisfaction in installing the product/service for use | 6 | 0% |
| 3. Customer's level of satisfaction in setting up the product/service for use | 6 | 0% |
| 4. Customer's level of satisfaction in learning to use the product/service | 6 | 0% |
| 5. Customer's level of satisfaction in customizing the product/service for use | 6 | 0% |
| 6. Customer's level of satisfaction in using/interfacing with the product/service | 5 | 0% |
| 7. Customer's level of satisfaction in maintaining the product/service for use | 5 | 0% |
| 8. Customer's level of satisfaction in storing the product | 5 | 0% |
| 9. Customer's level of satisfaction in disposing of the product | 5 | 0% |
| 10. Customer's cost of acquisition | 5 | 0% |
| 11. Customer's cost of labor to execute the job of interest | 5 | 0% |
| 12. Customer's cost of acquiring required ancillary products | 5 | 0% |
| 13. Customer's cost of learning how to get the job done | 5 | 0% |
| 14. Customer's cost of customizing the product/service for use | 5 | 0% |
| 15. Customer's cost of installation | 5 | 0% |
| 16. Customer's cost of maintenance | 5 | 0% |
| 17. Customer's cost of storage | 5 | 0% |
| 18. Customer's cost of disposal | 5 | 0% |
| 19. Customer's cost of switching solutions | 5 | 0% |
| 20. Other | 0 | 0% |

TABLE 3

Value Delivery Platform Company Criteria

| Categories | Category Weights | Platform Selection - Company Criteria | Threshold Value | Criteria Importance | Overall Weights |
|---|---|---|---|---|---|
| Ability to own/capture value that is created | 25 | 1. Percent probability that the value delivery platform cannot be copied by a competitor | 0% | 15 | 3.8 |
| | | 2. Percent probability that the value delivery platform does not contain a competitor's intellectual property | 0% | 15 | 3.8 |
| | | 3. Percent probability that the value delivery platform erects barriers to competitive entry | 0% | 14 | 3.5 |

TABLE 3-continued

Value Delivery Platform Company Criteria

| Categories | Category Weights | Platform Selection - Company Criteria | Threshold Value | Criteria Importance | Overall Weights |
|---|---|---|---|---|---|
| | | 4. Percent of targeted unmet needs for which features could be devised on this platform | 0% | 14 | 3.5 |
| | | 5. Percent of the targeted population for which the value delivery platform will not present a cultural taboo, e.g., considered immoral, offensive, against tradition, sacrilegious, etc. | 0% | 14 | 3.5 |
| | | 6. Percent probability that the value delivery platform can be used to create multiple product lines in the targeted growth path | 0% | 14 | 3.5 |
| | | 7. Percent probability that the value delivery platform will be reimbursed by a third party, e.g., by insurance companies, governments, etc. | 0% | 14 | 3.5 |
| Ability to technically produce the value delivery platform | 25 | 8. Percent probability that the value delivery platform can be developed without dependence on invention, e.g., the creation of new materials, new mechanisms, new electronics, etc. | 0% | 15 | 3.8 |
| | | 9. Percent probability that the technologies chosen for the value delivery platform are technically compatible, e.g., able to interface, work together, fit together, etc. | 0% | 15 | 3.8 |
| | | 10. Percent probability that the technologies chosen for the value delivery platform will deliver the intended function, e.g., satisfy needs, enhance performance, etc. | 0% | 14 | 3.5 |
| | | 11. Percent probability that the technologies chosen for the value delivery platform will not combine to produce unwanted side-effects, e.g., an unexpected result, an undesirable outcome, etc. | 0% | 14 | 3.5 |
| | | 12. Percent probability that the value delivery platform can be developed with equipment that is proven to work in the manufacturing environment, e.g., fabrication, assembly | 0% | 14 | 3.5 |

TABLE 3-continued

Value Delivery Platform Company Criteria

| Categories | Category Weights | Platform Selection - Company Criteria | Threshold Value | Criteria Importance | Overall Weights |
|---|---|---|---|---|---|
| | | and testing equipment, etc. | | | |
| | | 13. Percent probability that the value delivery platform is producible at needed volumes | 0% | 14 | 3.5 |
| | | 14. Percent probability that the value delivery platform does not violate an industry standard, e.g., design standards, data exchange standards, trade standards, etc. | 0% | 14 | 3.5 |
| Ability to organizationally deliver the value delivery platform | 25 | 15. Amount of time required to design the value delivery platform, e.g., comply with regulations, finalize technology implementation, etc. | 0 | 13 | 3.3 |
| | | 16. Amount of time required to develop the value delivery platform, e.g., engineer a functional product/service, optimize energy consumption, make cost-related trade-offs, etc. | 0 | 13 | 3.3 |
| | | 17. Amount of time required to create any invention needed to produce/deliver the value delivery platform | 0 | 13 | 3.3 |
| | | 18. Amount of time required to test the functionality of the value delivery platform, e.g., prove value delivery platform functionality, make needed adjustments, etc. | 0 | 13 | 3.3 |
| | | 19. Amount of time required to develop the manufacturing process to produce the value delivery platform, e.g., lay out the sequence, decide on equipment needed, test the lines, etc. | 0 | 12 | 3.0 |
| | | 20. Amount of time required to scale the manufacturing process chosen for the value delivery platform, e.g., obtain needed people, facilities, equipment, etc. | 0 | 12 | 3.0 |
| | | 21. Amount of time required to enable the supply chain needed to produce the value delivery platform, | 0 | 12 | 3.0 |

TABLE 3-continued

Value Delivery Platform Company Criteria

| Categories | Category Weights | Platform Selection - Company Criteria | Threshold Value | Criteria Importance | Overall Weights |
|---|---|---|---|---|---|
| | | e.g., identify suppliers, warehousing needs, etc. | | | |
| | | 22. Amount of time required to obtain necessary regulatory approvals, e.g., federal government, state government, international regulations, etc. | 0 | 12 | 3.0 |
| Ability to invest in the creation | 25 | 23. Cost required to design the value delivery platform, e.g., add features, comply with regulations, finalize technology implementation, etc. | $0.00 | 13 | 3.3 |
| | | 24. Cost required to develop the value delivery platform, e.g., engineer a functional product/service, optimize energy consumption, make cost-related trade-offs, etc. | $0.00 | 13 | 3.3 |
| | | 25. Cost required to test the functionality of the value delivery platform, e.g., prove value delivery platform functionality, make needed adjustments, etc. | $0.00 | 13 | 3.3 |
| | | 26. Cost required to develop the manufacturing process to produce the value delivery platform, e.g., lay out the sequence, decide on equipment needed, test the lines, etc. | $0.00 | 13 | 3.3 |
| | | 27. Cost required to scale the manufacturing process chosen for the value delivery platform, e.g., obtain needed people, facilities, equipment, etc. | $0.00 | 12 | 3.0 |
| | | 28. Cost required to set-up the supply chain needed to produce the value delivery platform, e.g., identify suppliers, warehousing needs, etc. | $0.00 | 12 | 3.0 |
| | | 29. Cost required to obtain the necessary regulatory approvals, e.g., federal government, state government, international regulations, etc. | $0.00 | 12 | 3.0 |

TABLE 3-continued

Value Delivery Platform Company Criteria

| Categories | Category Weights | Platform Selection - Company Criteria | Threshold Value | Criteria Importance | Overall Weights |
|---|---|---|---|---|---|
| | | 30. Cost of on-going operations, e.g., fixed costs, variable costs, etc. | $0.00 | 12 | 3.0 |
| Other | 0 | 31. | 0% | 20 | 0.0 |
| | | 32. | 0% | 20 | 0.0 |
| | | 33. | 0% | 20 | 0.0 |
| | | 34. | 0% | 20 | 0.0 |
| | | 35. | 0% | 20 | 0.0 |

TABLE 4

Value Delivery Platform Societal Criteria

| Platform Selection - Societal Criteria | Criteria Importance | Threshold Value |
|---|---|---|
| Percent probability that the value delivery platform does not pose a health risk to the user, e.g., the threat of injury, disease, addiction, chronic condition, etc. | 9 | 0% |
| Percent probability that the value delivery platform does not pose a health risk to others, e.g., children, bystanders, etc. | 9 | 0% |
| Percent probability that the value delivery platform will conserve the earth's natural resources, e.g., oil, water, minerals, trees, etc. | 9 | 0% |
| Percent probability that the value delivery platform will not pollute the earth's environment, e.g., air, water, soil, etc. | 9 | 0% |
| Percent probability that the value delivery platform will preserve the earth's natural habitat, e.g., preserve the balance in the food chain, not upset the natural order, etc. | 8 | 0% |
| Percent probability that the value delivery platform will not contribute to world hunger, e.g., cause famine, food shortages, a poisoned food supply, etc. | 8 | 0% |
| Percent probability that the value delivery platform will not contribute to crime, e.g., cause vandalism, robbery, assault, etc. | 8 | 0% |
| Percent probability that the value delivery platform will not degrade the world's standard of living, e.g., destroy wealth, cause poverty, etc. | 8 | 0% |
| Percent probability that the value delivery platform will not contribute to social injustice, e.g., cause repression, prejudice, sexism, etc. | 8 | 0% |
| Percent probability that the value delivery platform will not contribute to social instability, e.g., cause the division of people, discontent, etc. | 8 | 0% |
| Percent probability that the value delivery platform does not result in the invasion of the customer's privacy | 8 | 0% |
| Percent probability that the value delivery platform does not violate a governmental regulatory agency requirement, e.g., federal, state, international, etc. | 8 | 0% |
| Other | 0 | 0% |

The business model selection engine 106 uses company criteria for selection of the appropriate business model for the delivery platform. Table 5 includes examples of potentially useful data.

TABLE 5

Business Model Company Criteria

Maximize revenue

Amount of revenue from primary product sales
Amount of revenue from primary service sales
Amount of revenue from ancillary product sales, e.g., options, add-ons, etc.
Amount of revenue from ancillary service sales, e.g., training, consulting, etc.
Amount of revenue from product upgrade sales
Amount of revenue from product/service customization sales
Amount of revenue from licenses and royalties
Amount of revenue from leases and rents, e.g., facilities, equipment, etc.

TABLE 5-continued

Business Model Company Criteria

Amount of revenue from product installation sales
Amount of revenue from product maintenance sales
Amount of revenue from product disposal sales
Amount of revenue from donations and contributions
Amount of revenue from fines, forfeitures, and penalties
Amount of revenue from other sources, e.g., advertising, grants, etc.
Minimize fixed costs Cost of manufacturing equipment
Cost of test equipment
Cost of distribution equipment, e.g., transportation, warehousing, etc.
Cost of information technology equipment
Cost of facility build-out
Cost of facilities, e.g., lease, rent, mortgage, etc.
Cost of puffing the installation infrastructure in place
Cost of putting the maintenance infrastructure in place

TABLE 5-continued

Business Model Company Criteria

Cost of putting the disposal infrastructure in place
Cost of regulatory compliance, e.g., inspection fees, impact fees, permit fees, etc.
Cost of acquiring necessary competencies, e.g., marketing, manufacturing, R&D, etc.
Minimize variable costs Cost of labor
Cost of goods sold, e.g., parts, materials, etc.
Cost of distribution, e.g., transportation, channel costs, etc.
Cost of overhead, e.g., management expenses, administrative expenses, etc.
Cost of inventory
Cost of taxes
Cost of product installation
Cost of product maintenance
Cost of product disposal
Optimize profit margins Percent profit margin
Percent probability that the targeted profit margin will be achieved
Maintain business relationships Percent probability that the business model will not damage established relationships with other companies, e.g., stifle cooperation, force competitiveness, undermine trust, etc.
Percent probability that the business model will not impede the set-up of the supply chain
Percent probability that the business model will not impede the on-going effectiveness of the supply chain
Time to profit First to market
Time to market The feature selection engine 107 adds features to the platform after a basic business model has been selected by the business model selection engine 106. The feature selection engine 107 can use multiple criteria to add or assist in the addition of features. The features database 116 includes entries associated with various types of features, such as applications (for use with a computer-implemented or Internet platform), telephone answering service parameters, power sources, etc. Features are the components added to a platform that directly address outcomes. Thus, they can be implicitly or explicitly tied to the jobs and outcomes of the jobs and outcomes database 110. Tables 6, 7, and 8 provide examples of data that would potentially be useful for such a determination.

TABLE 6

Customer Criteria

Customer benefit metrics

Degree to which customer satisfaction of targeted outcomes is improved by the feature, i.e.,
number of outcomes better satisfied and degree to which each is improved
Percent decrease in the customer's cost of acquisition
Customer cost metrics Degree to which customer satisfaction of non-targeted outcomes is decreased by the feature
Percent reduction in the customer's level of satisfaction in installing the product/service for use
Percent reduction in the customer's level of satisfaction in setting up the product/service for use
Percent reduction in the customer's level of satisfaction in learning to use the product/service
Percent reduction in the customer's level of satisfaction in customizing the product/service for use
Percent reduction in the customer's level of satisfaction in using/interfacing with the product/service
Percent reduction in the customer's level of satisfaction in maintaining up the product/service for use
Percent reduction in the customer's level of satisfaction in storing the product
Percent reduction in the customer's level of satisfaction in disposing of the product
Percent increase in the customer's cost of acquisition
Percent increase in the customer's cost of labor to execute the job of interest
Percent increase in the customer's cost of acquiring required ancillary products
Percent increase in the customer's cost of learning how to get the job done
Percent increase in the customer's cost of customizing the product/service for use
Percent increase in the customer's cost of installation
Percent increase in the customer's cost of maintenance
Percent increase in the customer's cost of storage
Percent increase in the customer's cost of disposal

TABLE 7

Company Criteria

Ability to own/capture value that is created

Percent probability that the feature cannot be copied by a competitor
Percent probability that the feature does not contain a competitor's intellectual property
Percent probability that the feature erects barriers to competitive entry
Percent of the targeted population for which the feature will not present a cultural taboo, e.g., considered immoral, offensive, against tradition, sacrilegious, etc.
Percent probability that the feature can be used in multiple product lines in the targeted growth path
Ability to technically produce the feature Percent probability that the feature can be developed without dependence on invention, e.g., the creation of new materials, new mechanisms, new electronics, etc.
Percent probability that the technologies chosen for the feature are technically compatible, e.g., able to interface, work together, fit together, etc.
Percent probability that the technologies chosen for the feature will deliver the intended function, e.g., satisfy needs, enhance performance, etc.
Percent probability that the technologies chosen for the feature will not combine to produce unwanted side-effects, e.g., an unexpected result, an undesirable outcome, etc.
Percent probability that the feature can be developed with equipment that is proven to work in the manufacturing environment, e.g., fabrication, assembly and testing equipment, etc.
Percent probability that the feature is producible at needed volumes TABLE 7-continued Company Criteria Percent probability that the feature does not violate an industry standard, e.g., design standards, data exchange standards, trade standards, etc.
Percent probability that the feature does not duplicate functionality, e.g., functionality existing in the platform, in other features, etc.
Percent probability that the feature works with other features without negating their performance
Ability to organizationally deliver the feature Amount of time required to design the feature, e.g., comply with regulations, finalize technology implementation, etc.
Amount of time required to develop the feature, e.g., engineer the function, optimize energy consumption, make cost-related trade-offs, etc.
Amount of time required to create any invention needed to produce/deliver the feature
Amount of time required to test the functionality of the feature, e.g., prove feature functionality, make needed adjustments, etc.
Amount of time required to develop the manufacturing process to produce the feature, e.g., lay out the sequence, decide on equipment needed, test the lines, etc.
Amount of time required to scale the manufacturing process chosen for the feature, e.g., obtain needed people, facilities, equipment, etc.
Amount of time required to set-up the supply chain needed to produce the feature, e.g., identify suppliers, warehousing needs, etc.
Amount of time required to obtain necessary regulatory approvals, e.g., federal government, state government, international regulations, etc.
growth[??]
Ability to afford the creation of the feature Cost required to design the feature, e.g., make trade-offs, comply with regulations, finalize technology implementation, etc.
Cost required to develop the feature, e.g., engineer the function, optimize energy consumption, make cost-related trade-offs, etc.
Cost required to test the functionality of the feature, e.g., prove feature functionality, make needed adjustments, etc.
Cost required to develop the manufacturing process to produce the feature, e.g., lay out the sequence, decide on equipment needed, test the lines, etc.
Cost required to scale the manufacturing process chosen for the feature, e.g., obtain needed people, facilities, equipment, etc.
Cost required to set-up the supply chain needed to produce the feature, e.g., identify suppliers, warehousing needs, etc.
Cost required to obtain the necessary regulatory approvals, e.g., federal government, state government, international regulations, etc.
Feature costs - to go into documentation sheet Development costs
Bill of material costs

TABLE 8

Societal Criteria

Percent probability that the feature does not pose a health risk to the user, e.g., the threat of injury, disease, chronic condition, etc.
Percent probability that the feature does not pose a health risk to others, e.g., children, bystanders, etc.
Percent probability that the feature will conserve the earth's natural resources, e.g., oil, water, minerals, trees, etc.
Percent probability that the feature will not pollute the earth's environment, e.g., air, water, soil, etc.
Percent probability that the feature will preserve the earth's natural habitat, e.g., preserve the balance in the food chain, not upset the natural order, etc.
Percent probability that the feature will not contribute to world hunger, e.g., cause famine, food shortages, a poisoned food supply, etc.
Percent probability that the feature will not contribute to crime, e.g., cause vandalism, robbery, assault, etc.
Percent probability that the feature will not degrade the world's standard of living, e.g., destroy wealth, cause poverty, etc.
Percent probability that the feature will not contribute to social injustice, e.g., cause repression, prejudice, sexism, etc.
Percent probability that the feature will not contribute to social instability, e.g., cause the division of people, discontent, etc.
Percent probability that the feature does not result in the invasion of the customer's privacy
Percent probability that the feature does not violate a governmental regulatory agency requirement, e.g., federal, state, international, etc.

After the features are selected, the business model selection engine 106 can construct or facilitate the construction of a set of product or service models, estimate or facilitate making an estimate of the cost and price point of each model, and in general make the basic business model more comprehensive. It has been found that attempting to generate features prior to the basic business model is wasteful of resources, and attempting to generate a comprehensive business model without first considering features is difficult for an artificial intelligence, and for a human, for that matter. For illustrative purposes, the best business models are stored in the recommended business models database 114. The recommended business models may include a rating of investment quality (e.g., estimated risk and/or reward).

The investment engine 108 considers the data from each of the databases and provides an investment recommendation. Because of the job-based approach providing funding to various aspects of a product or service model could be automated.

It may be noted that at various points in the system 100, user input may be desirable if the artificial intelligence of the system is not up to a particular task. In some cases, the combination of computer data processing and human intelligence can be useful for identifying or quantifying different aspects of a problem.

Figure 2:
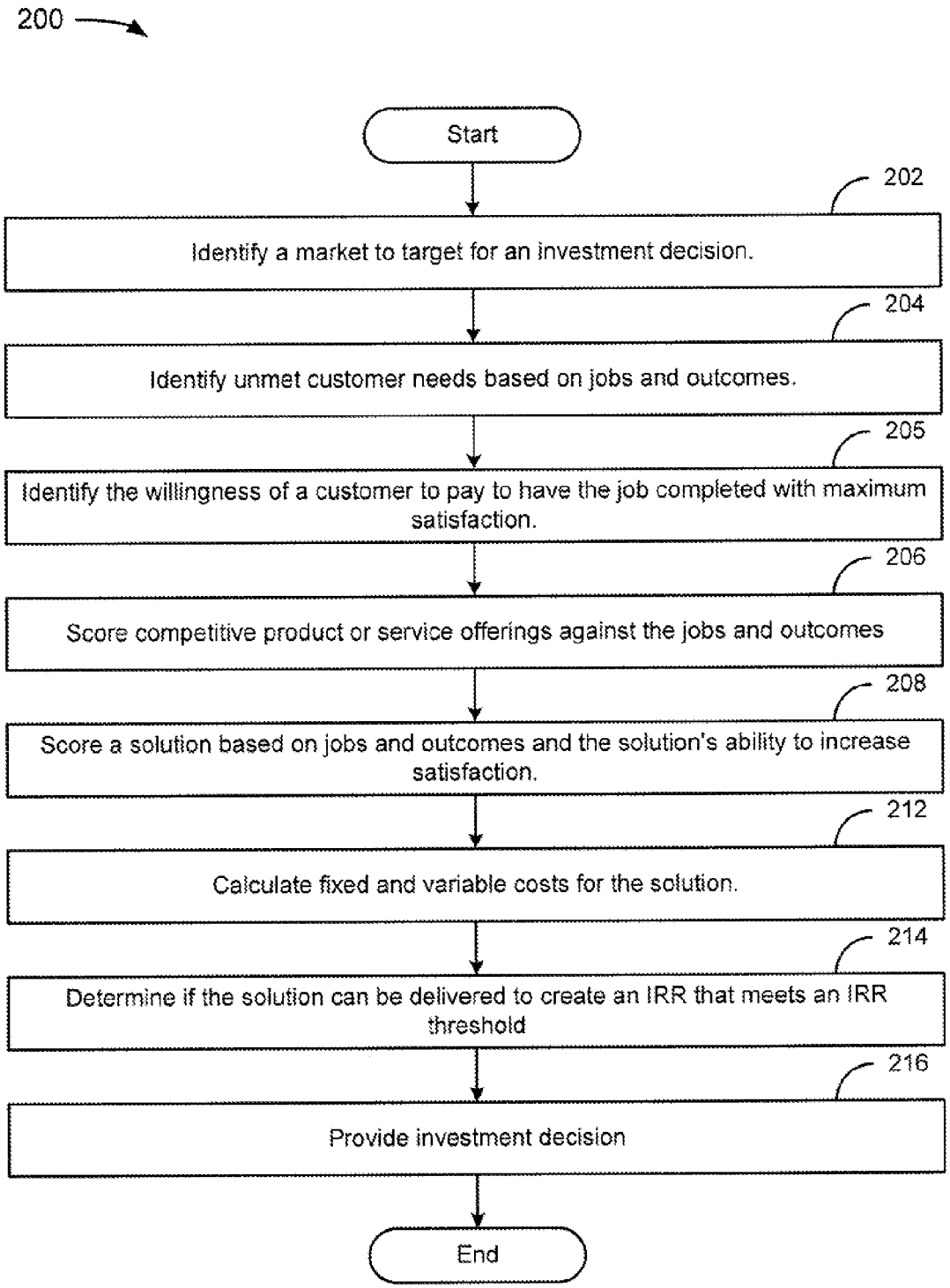
FIG. 2 depicts a flowchart of an example of a method for providing an investment decision.

FIG. 2 depicts a flowchart 200 of an example of a method for providing an investment decision based on a product or service's ability to satisfy unmet customer needs and a company's ability to create and capture financial returns from investing in the development and sales of the product or service. In a specific implementation, hundreds of different inputs related to the market opportunity, the customer need (the customer jobs and their outcomes), the competitors, the solution, the pricing, costs, and financing are considered.

The method is organized as a sequence of modules in the flowchart 200. However, it should be understood that these and other modules associated with other methods described herein may be reordered for parallel execution or into different sequences of modules. One or more of the modules (or portions thereof) may be implemented on a computer readable medium for access and/or execution by a computer.

In the example of FIG. 2, the flowchart 200 starts at module 202 with identifying a market to target for an investment decision. The market can be defined as a demographic (e.g., a group of people) and the job or jobs they are trying to accomplish (e.g., the goal they are trying to achieve or problem they are trying to solve for a given situation). A number of different inputs are used to determine if the market meets the threshold criteria level. Examples of such inputs were illustrated with reference to FIG. 1.

In the example of FIG. 2, the flowchart 200 continues to module 204 with identifying unmet customer needs based on jobs (e.g., the goals the customer is trying to accomplish) and outcomes (e.g., the measurable outcomes related to the speed, stability, and output of performing the job). Each job and outcome can be rated for its importance and satisfaction level by the customer, an opportunity score algorithm such as this one: opportunity score=importance+max(importance−satisfaction, 0).

For each customer job, in a specific implementation, there can be 50 to 150 different outcomes and the opportunity score represents if the outcome or job is underserved, appropriately served or over served. If the opportunity score for a job or outcome fails to exceed an opportunity threshold (e.g., the opportunity score is indicative of an appropriately served or over served job), the investment engine can determine if there is a segment of the customers (e.g., a specific part of the demographic) that views the job or outcome as being underserved. This facilitates defining a market with more granularity or identifying underserved "niche" jobs in an appropriately served or over served market.

In the example of FIG. 2, the flowchart 200 continues to module 205 with identifying the willingness of a customer to pay to have the job completed with maximum satisfaction, or 100% satisfaction levels. Pricing inputs can be used to determine customer willingness to pay.

In the example of FIG. 2, the flowchart 200 continues to module 206 with scoring the competitive product or service offerings against the jobs and outcomes to determine how well each offering is satisfying the customers.

In the example of FIG. 2, the flowchart 200 continues to module 208 with scoring the solution based on jobs and outcomes and the solution's ability to increase satisfaction. The value add of the solution is based on the weighted average of the opportunity score. The value add of a solution is based on satisfying the outcomes. An example of a weighted average adequate to represent a value add, V, is:

$$V=(V_{new}-V_{old})/V_{old},$$

where $V_{new}$ is the new value score and $V_{old}$ is the old value score.

The old value score can be represented by, for example, this equation:

$$V_{old}=\Sigma(O_i/S_i),$$

where $O_i$ is the old satisfaction value for an $i^{th}$ job and $S_i$ is the maximum satisfaction value for the $i^{th}$ job.

The new value score can be represented by, for example, this equation:

$$V_{new}=\Sigma[N_i*(O_i/S_i)],$$

where $N_i$, is the new satisfaction value for an $i^{th}$ job.

In the example of FIG. 2, the flowchart 200 continues to module 212 with calculating fixed and variable costs for the solution. Pricing, solution satisfaction, and cost can be used to determine whether a cost can be used to produce and deliver the solution to the customer and those costs plus the customer's willingness to pay and the solution satisfaction levels to determine the financial value of the solution.

In the example of FIG. 2, the flowchart 200 continues to module 214 with determining if the solution can be delivered to create an investment rate of return (IRR) that meets an IRR threshold.

In the example of FIG. 2, the flowchart 200 continues to module 216 with providing an investment decision. Advantageously, by using the tool, high-quality investment decisions can be largely automated based upon comparisons with competitor tools and a database of successfully generated tools (platform templates).

FIG. 3 is intended to illustrate an example of a value add proposition for several outcome statements using techniques described with reference to FIGS. 1 and 2.

Figure 4:
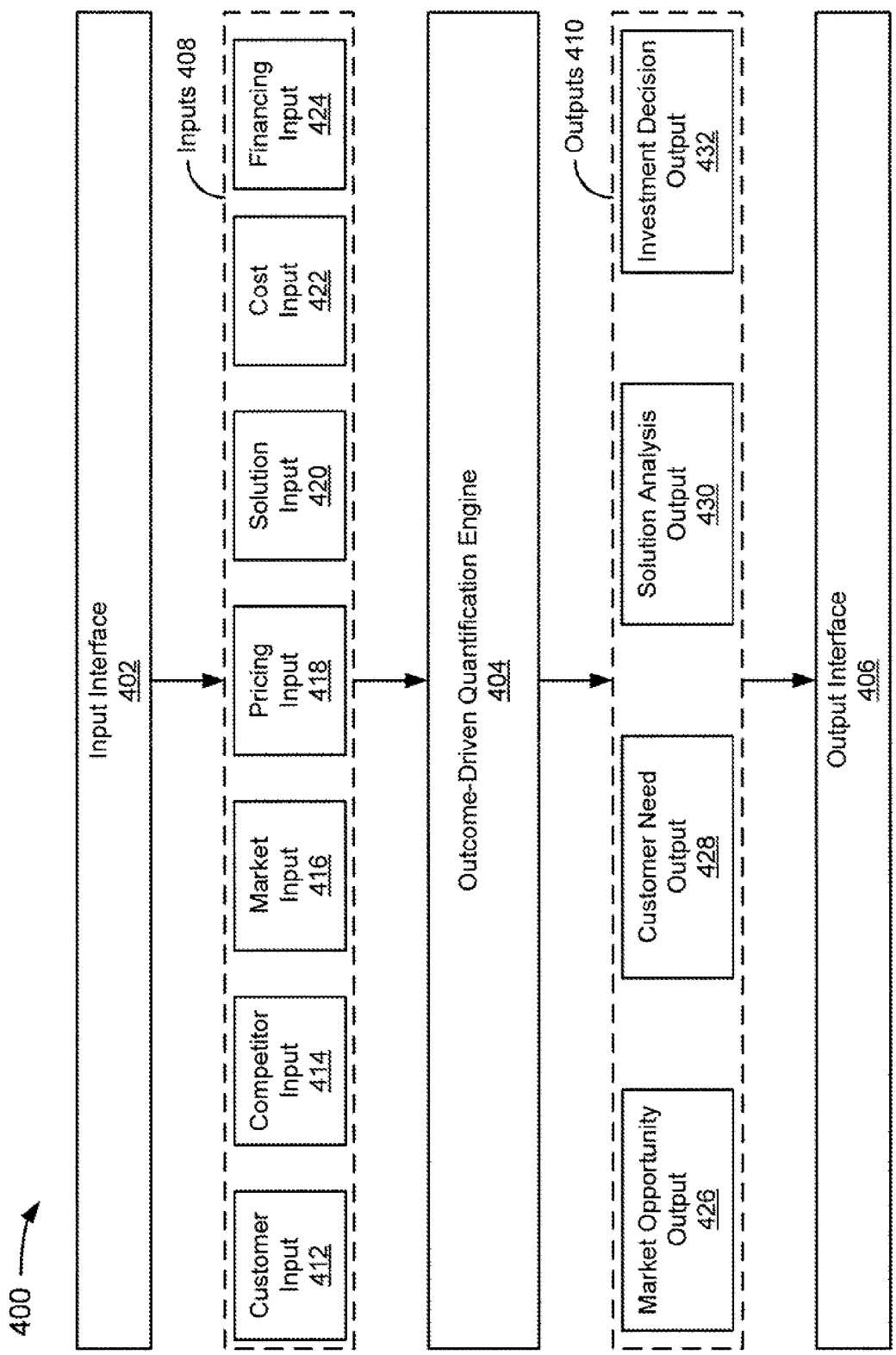
FIG. 4 depicts an example of a system for making investment decisions.

FIG. 4 depicts an example of a system 400 for making investment decisions. FIG. 4 includes an input interface 402, an outcome-driven quantification engine 404, and an output interface 406. The outcome-driven quantification engine 404 is coupled to the input interface 402 and the output interface 406.

The input interface 402 may include one or more known or convenient hardware devices (such as keyboard, mouse, USB port, storage medium, etc.) and/or software or firmware modules (such as drivers, database interfaces, etc.). The exact nature of the input interface 402 is not critical so long as the interface is capable of providing computer-readable data. As is known in the relevant art, in operation the input interface 402 is typically coupled to one or more processors.

The outcome-driven quantification engine 404 includes software modules (e.g., data and executables). When the software modules are implemented on a hardware device (e.g., memory)—or on some other known or convenient machine, manufacture, or composition of matter capable of storing data and/or instructions, at least ephemerally, thereon—this may be referred to as implementing the outcome-driven quantification engine 404 in a computer-readable medium. A computer readable medium can be coupled to a processor in a known or convenient manner.

The outcome-driven quantification engine 404 has various techniques to quantify a venture. For example, the outcome-driven quantification engine 404 can include algorithms based on customer needs (e.g., jobs and outcomes), importance, and satisfaction. In a specific implementation, the outcome-driven quantification engine 404 is capable of processing large amounts of data in real time or near-real time. This is advantageous because due to the amount of data and varying market or other conditions, it may be desirable to use the engine multiple times for different models.

The output interface 406 may include one or more known or convenient hardware devices (such as monitor, printer, USB port, storage medium, etc.) and/or software or firmware modules (such as drivers, database interfaces, etc.). The exact nature of the output interface 406 is not critical so long as the interface is capable of providing computer-readable data. As is known in the relevant art, in operation the output interface 406 is typically coupled to one or more processors.

In the example of FIG. 4, in operation, the input interface 402 provides inputs 408 to the outcome-driven quantification engine 404. The inputs 408 may be provided from a remote or external source over a network, from a local input device, or from local storage (e.g., from a hard disk). The inputs 408 can be real-time input from a panel of experts, data from databases, direct input from a user of the system 400, etc. In the example of FIG. 4, the inputs 408 include customer input 412, competitor input 414, market input 416, pricing input 418, solution input 420, cost input 422, and financing input 424.

The customer input 412 can include discrete jobs. Advantageously, jobs have quantifiable importance and satisfaction levels. Theoretically, the customer input 412 can include any number of jobs, but current empirical models provide for dozens or hundreds of jobs. While one or just a few jobs could be input, an advantage of the system 400 is that it can process practically any number of jobs in a manner that may not be possible for a human. The customer input 412 can also include outcomes for discrete jobs. Outcomes include goals that, e.g., a customer is trying to reach. Advantageously, outcomes can also have quantifiable importance and satisfaction levels.

The competitor input 414 can include discrete jobs that can be quantifiable in importance and satisfaction levels. However, unlike customer input, competitor inputs for jobs are based on a competitive product or service. The competitive product or service may be an actual one, or a theoretical one. The competitor input 414 can also include outcomes for discrete jobs.

The market input 416 can include discrete jobs. The discrete jobs are, for example, jobs that a demographic is attempting to accomplish. The market input 416 can also include demographic data. Demographic data can include, for example, a size and description of a demographic that is attempting to accomplish a job.

The pricing input 418 can include discrete jobs. Pricing inputs for discrete jobs may represent the willingness to pay to complete the job perfectly (as used herein, perfect is intended to mean as near to perfect as is reasonable for a given job) for a demographic that is trying to get the job done. The pricing input 418 can also include outcomes for discrete jobs. Outcomes, in this case, can represent an incremental willingness to pay to satisfy an outcome perfectly for a demographic.

The solution input 420 can include discrete jobs. Solution inputs for jobs can have quantifiable importance and satisfaction levels of completing a job with a specific solution. The solution input 420 can also include outcomes for the jobs, which can have quantifiable importance and satisfaction levels of job outcome with the specific solution.

The cost input 422 can have discrete jobs that represent costs to deliver a solution for the job, and the outcomes.

The financing input 424 can include different options for financing growth of a company. For example, the financing input 424 can include the cost of capital and IRR hurdles.

The outcome-driven quantification engine 404 processes the inputs 408 to produce outputs 410. The operation of the outcome-driven quantification engine 404 is described in more detail later in this paper. Depending upon the implementation, the outcome-driven quantification engine 404 can use feedback on success in order to learn, and thereby improve the accuracy of the outputs 410. The outputs 410 may be provided to a remote or external source over a network, to a local display, or to local storage (e.g., to a hard disk) for later use. In the example of FIG. 4, the outputs 410 include market opportunity output 426, customer need output 428, solution analysis output 430, and investment decision output 432.

The market opportunity output 426 can take into consideration all of the inputs 408 and scores the market opportunity. The market opportunity output 426 should identify the degree to which there is a market opportunity based upon, for example, unmet customer needs, competitive products, etc.

The customer need output 428 takes into consideration job and outcome scores (e.g., satisfaction levels). The customer need output 428 should identify unmet customer need based on importance and satisfaction levels of jobs and outcomes.

The solution analysis output 430 takes into consideration job and outcome scores (e.g., satisfaction levels) of different solution ideas. The solution analysis output 430 should identify a degree to which a solution adds value based on job and outcome satisfaction levels.

The investment decision output 432 takes into consideration all of the inputs 408. The investment decision output 432 should identify whether an investment is warranted and expected returns.

Figure 5:
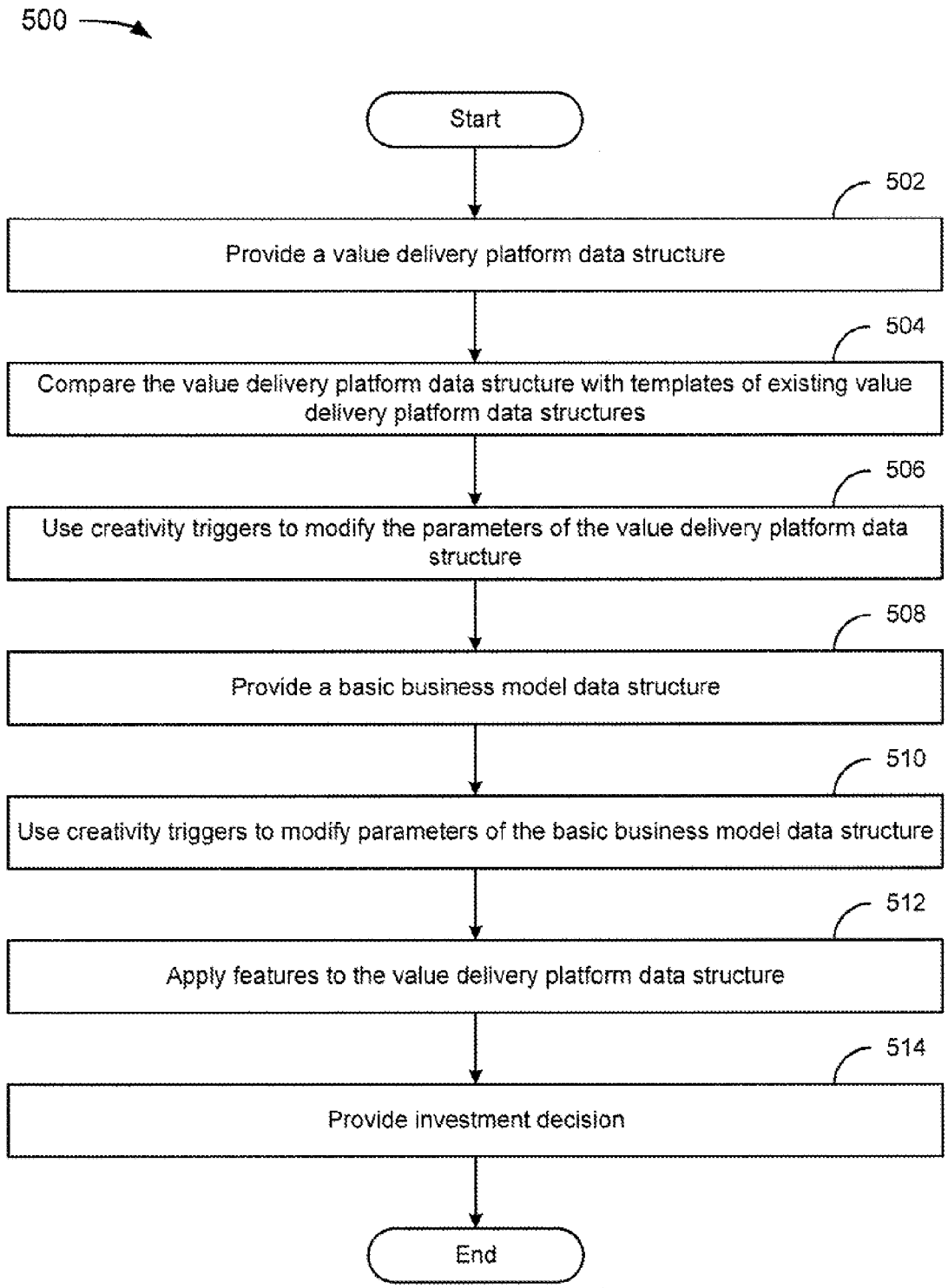
FIG. 5 depicts a flowchart of an example of a method for providing an investment decision.

FIG. 5 depicts a flowchart 500 of an example of a method for providing an investment decision based on a strictly hierarchical approach that generates a platform before generating a basic business model before generating features for the platform to directly address outcomes. Where a platform is provided in advance, the flowchart can begin at module 508. Where a basic business model is provided in advance, the flowchart can begin at module 512. This method may take advantage of competitive product or service offerings that have already been scored against jobs and outcomes. (For example, the modules 502-512 of FIG. 5 could be inserted into the flowchart 200 between modules 206 and 208.)

In the example of FIG. 5, the flowchart 500 starts at module 502 with providing a value delivery platform data structure. A framework for focused idea generation includes the following rules: 1) Conduct idea generation for only one type of idea at a time. The types of ideas are platform, business model, and feature set. If the goal is to generate a new platform, then those involved in the creative process should generate ideas only for the new platform, not ideas related to a business model or features. Failure to follow this rule can result in a mix of ideas that cannot be considered or evaluated together. 2) Generate ideas for platforms, then business models, then features. For radical innovation, the platform should be approved by management before moving on to business model ideation, and the business model should be approved by management before moving on to feature set ideation. This sequence improves efficiency by decreasing the probability of wasting time and effort on unused business models or features. Of course, if the platform and business model are already established, ideation can start immediately on features. 3) Focus idea generation on specific jobs and desired outcomes.

While the value delivery platform is abbreviated to "platform" in this paper, it should be noted that a value delivery platform data structure is new term. It is intended to represent a system infrastructure and subsystems that deliver a core product or service function, enabling a customer to get a job of interest done. The value delivery platform is the system into which features will be integrated and the glue that holds those features in place. Thus, the term is not intended to simply refer to a product family platform (such as a frame for a family of automobiles).

The value delivery platform data structure may be designed for use with a product or a service. For a product, parameters include energy source, size, and shape. (Core mechanical, electrical, chemical and/or software components could be considered subsystems.) For a service, parameters include physical assets (e.g., buildings, trucks, etc.) and other resources (e.g., people, information, organizational structure, software, communication systems, etc.). In practice, the data structure should have sufficient parameters to explain how an available system infrastructure and subsystems enable a customer to get a job of interest done, but should not normally include all features needed to satisfy the customers desired outcomes.

In the example of FIG. 5, the flowchart 500 continues to module 504 with comparing the value delivery platform data structure with templates of existing value delivery platform data structures. One advantage of data structures is that specially programmed computers can make comparisons between them. Templates of existing platforms can suggest modularity. For example, if a platform size is reduced, then a platform weight is also frequently reduced. This forms a correlation between a first parameter modification and a second parameter modification that can be attempted first because of the experience learning that the first often goes with the second. Other jobs may not have correlations that are readily apparent, but by analyzing a plethora of templates, a correlation may emerge. Thus, certain metrics may form a theme or grouping, facilitating a segmentation of a market based upon scores associated with various parameters. This can be exceptionally valuable when efficiently generating a tool (described later with reference to the example of FIG. 5).

In the example of FIG. 5, the flowchart 500 continues to module 506 with using creativity triggers to modify the parameters of the value delivery platform data structure. Advantageously, since the platform is separate from the business model and features, changes to the platform are possible without impacting subsystems or the business model in use. Moreover, it becomes possible to automate the ideation process, resulting in specially programmed computers that can actually innovate without human assistance. In an implementation that includes human oversight, the specially programmed computer can apply creativity triggers to provide a desirable solution that a human need only consent to, or modify, after the specially programmed computer provides the innovation to the human. By comparing the innovation using templates of existing platforms, the innovation that resembles previously successful innovation efforts can "float to the top" or be given more weight, enabling rapid identification of good innovation.

To enable computer innovation, creativity triggers can be programmed in association with various data structure parameters. It should be noted that humans would also likely find the creativity triggers useful in attempting innovations related to the value delivery platform. A relatively comprehensive list of examples of creativity triggers are provided in Table 9.

TABLE 9

Creativity Triggers for Value Delivery Platforms

1. Change the platform into another state of matter to get the job done
2. Make the platform virtual
3. Make the platform disposable
4. Create a new platform to execute a portion of a job that is performed inefficiently on the core
5. Make the platform out of a large number of small platforms
6. Make the platform modular so each step in the job can be optimized for performance
7. Remove platform infrastructure that is not needed to get the job done
8. Borrow available resources and make them part of the platform
9. Eliminate the wasting of consumables
10. Construct the platform so that consumables are eliminated TABLE 9-continued Creativity Triggers for Value Delivery Platforms 11. Make the platform customizable
12. Make one standardized platform
13. Reduce the size of the platform
14. Make the platform scalable
15. Construct the platform so that it allows third parties to add features or content over time
16. Make the platform capable of performing additional jobs
17. Make the platform automatically perform physical activities
18. Make the platform automatically perform decision-making activities
19. Make the platform identify and self-correct its mistakes
20. Hid platform infrastructure that does not have to be visible
21. Construct the platform so that it can perform the job at a different frequency
22. Construct the platform so that it can perform the job at different speeds
23. Construct the platform so that there is no downtime in the execution of the job
24. Reduce the weight of the platform
25. Construct the platform to eliminate all product life cycle issues
26. Make the platform energy efficient In the example of FIG. 5, the flowchart 500 continues to module 508 with providing a basic business model data structure. A specially programmed computer can make suggestions regarding a basic business model and predictions about profitability, based upon basic business model templates associated with value delivery platform templates that are in at least some way similar to the platform being considered.

In the example of FIG. 5, the flowchart 500 continues to module 510 with using creativity triggers to modify parameters of the basic business model data structure. Creativity triggers can be used to improve upon the basic business model. For example, a creativity trigger to "turn a waste into a revenue" could cause the specially purposed computer to consider the value of a byproduct of a process for sale to another entity, or perhaps for use in some other process. So a creativity trigger to "turn a cost into a revenue" may trigger a suggestion to charge a customer for sales calls based upon an at least similar in some respects basic business model template.

In the example of FIG. 5, the flowchart 500 continues to module 512 with applying features to the value delivery platform data structure. As used in this paper, a feature is a tangible or intangible that performs a function that allows customers to better satisfy a desired outcome. A feature can include, by way of example, a piece of information, an action, a component, a material, a part of a physical object, or the like. When features are integrated into the value delivery platform, the resultant data structure can be referred to as a "tool." That is, a process or device that accomplishes or can be used to accomplish a job. Advantageously, the tool is virtual, but platform-level parameters and business model parameters are known, or at least predicted, for the tool before it is ever implemented or physically created. Moreover, in a system that includes competitor input, virtual tools of competitors can also be created and the differences understood before launching a product.

In the example of FIG. 5, the flowchart 500 continues to module 514 with providing an investment decision. Advantageously, by using the tool, high-quality investment decisions can be largely automated based upon comparisons with competitor tools and a database of successfully generated tools (platform templates).

FIG. 6 depicts an example of a platform data structure 600. The data structure 600 includes a size parameter 602. In an implementation where the platform is represented as an object, the size parameter 602 can include a different value for each of a plurality of subcomponents that make up the platform. The greater the accuracy of the size parameter, the more effectively a platform innovation engine will be able to vary the size and evaluate the desirability of the variation. The platform innovation engine is well-suited to determining how changes in size will impact how the objects fit together geometrically. (If you change the size of a bolt, it will impact the size of a nut, for example.)

The data structure 600 includes a material parameter 604. In some cases, it may be desirable to change the platform into another state of matter (e.g., use a liquid or gas instead of a solid, use light waves instead of heat, etc.). In other cases, it may be desirable to virtualize certain portions of the platform (e.g., simulated, digital, etc.). In other cases, it may be desirable to use disposable materials. These various options require a relatively sophisticated description of material, rather than simply a relative number. In some cases, operating temperatures may be relevant to ensure that solids do not melt. So the greater the detail provided in the material parameter 604, the better the platform innovation engine will be able to substitute values to provide meaningful results. As a simple example, consider a toothbrush as a platform. The handle may be constructed of plastic having a certain composition, springiness, hardness, smoothness, etc. If a parameter (say, springiness), is not listed, then the platform innovation engine will be unable to address a customer desire to have a springier handle. Other relatively straight-forward material data includes the cost of the material, and durability (lifetime). For a component to be made disposable, it would likely be desirable to reduce the durability to a proper range, and reduce the materials cost as well.

The data structure 600 includes a weight parameter 606. Although it is true that if a size and material is clearly defined, the weight can be derived, it is not always efficient to attempt to describe a material with such specificity as to make the weight of the object completely predicable. For certain objects having a size and material density, of course, weight could be derived. In some cases, it may be desirable to consider increasing weight by adding another component, such as a metal base, and it is probably a more effective use of resources to record the final weight (or even the weight of each component) rather than recomputed weight from size and material of each component each time.

The data structure 600 includes an interconnectivity parameter 608. As has been mentioned, a platform can comprise multiple components. The components can be modular, identical, opposite, independent, connected, etc. The interconnectivity parameter 608 describes the connections of the various components. This can facilitate an analysis of how to create a new platform to execute a portion of the job that is performed inefficiently on an old platform, increase or decrease the number of components, or improve modularity or reuse redundant components. The interconnectivity parameter 608 can also provide insight into how to attach components in a scalable fashion ("scalability").

The data structure 600 includes a functionality parameter 610. The functionality parameter 610 can describe a transformation of an input into an output. Some components do not have any transformational functionality however, such as a chassis that holds components together or a base that provides stability. The functionality can be relevant for determining how size, interconnectivity, and weight can be adjusted to improve the functionality. When determining whether a platform meets the requirements of a job, assuming the functionality parameter 610 is sufficiently accurate, some components might be determined to be unnecessary. That is, some components might have other purposes (or not), but those purposes are not necessary for a particular job that is being considered. This can be useful to a platform innovation engine when suggesting to remove systems of subsystems from a platform. Also, knowing the functionality of other components can help suggest modification of the platform to allow the addition of features or content by third parties; make the platform capable of performing additional jobs, perhaps by redundantly using present functionality; and make the platform capable of automatically performing physical activities, decision-making activities, or self-correction. In many ways, this can be thought of as an interplay between the interconnectivity parameter 608 and the functionality parameter 610.

The data structure 600 includes a rate parameter 612. The rate parameter 612 can be associated with frequency, speed, or downtime. Generally, frequency and speed might be better increased or decreased, while downtime is best minimized.

The data structure 600 includes a resources parameter 614. Resources can include resources available (energy, materials, information, dimensionality, waste, objects, people, etc.). If a resource can be used, then a platform innovation engine might tweak parameters to see if there is improvement. For example, if a widget can be increased in size without pushing against a casement, it might be desirable to decrease the size of the casement or increase the size of the widget. Resources can also include consumables, which perhaps can be reduced or eliminated, or the source of the consumables could be changed to take advantage of byproducts (waste) of another component or separate platform. Efficiency can even be improved by using a different power source or identifying use and perhaps shutting down when not in use.

The data structure 600 includes a standardization parameter 616. The flip side of standardization is customization. Defining how much of a component is standardized can facilitate determining what portions can be customized.

The data structure 600 includes a life cycle parameter 618. It is typically desirable to reduce or eliminate all product life cycle issues (e.g., packaging, installation, maintenance, storage, disposal, etc.). The more descriptive the data, the better a platform innovation engine will be able to identify potential improvements.

The data structure 600 includes a score parameter 620. The score parameter 620 can be associated with one or more of the other parameters. Sometimes, depending upon the job, one or more of the parameters may be irrelevant in determining a score. It should be noted that the score parameters 620 comprises a plurality of subscores derived from the satisfaction and value associated with various other parameter values, depending upon the job (see, e.g., FIG. 3).

Advantageously, where data structures have the same format, comparisons across data structures become informative. Additional parameters could be useful, but the parameters depicted in the example of FIG. 6 are intended to be relatively comprehensive.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Implementations can also relate to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present example is not described with reference to any particular programming language, and various examples may thus be implemented using a variety of programming languages.

What is claimed is:

1. A system comprising:
a processor and a memory;
a platform templates datastore;
a platform innovation engine coupled to the platform templates datastore;
a business model selection engine coupled to the platform templates datastore;
an investment engine coupled to the platform templates datastore;
a jobs and outcomes datastore;
a market selection engine coupled to the jobs and outcomes datastore;
wherein, in operation:
the platform innovation engine adjusts parameters of a template from the platform templates datastore to improve a score associated with a job;
the business model selection engine facilitates generation of a basic business model using a platform associated with the template;
the investment engine:
determines if a venture can create an investment rate of return (IRR) that exceeds an IRR threshold;
recommends, based on the determination, investment in the venture utilizing the platform associated with the template and the basic business model;
the market selection engine selects a market using jobs data from the jobs and outcomes datastore.

2. The system of claim 1 further comprising:
a target markets datastore;
a customer data capture engine coupled to the target markets datastore;
wherein, in operation, the customer data capture engine captures desired outcomes for jobs for use by the platform innovation engine.

3. The system of claim 1 further comprising:
a recommended business models datastore coupled to the business model selection engine and the investment engine;
wherein the business model selection engine stores the basic business model in the recommended business models datastore and the investment engine uses the basic business model from the recommended business models datastore.

4. The system of claim 1 further comprising:
a features datastore;
a feature selection engine coupled to the features datastore;
wherein, in operation, the feature selection engine adds features to the platform.

5. The system of claim 1 wherein the investment engine is configured to calculate fixed and variable costs of the basic business model.

6. The system of claim 1 wherein the investment engine is configured to quantify the venture.

7. The system of claim 6 wherein the quantification of the venture is based on one or more of customer need scores, importance scores, and satisfaction scores.

8. A method comprising:
adjusting parameters of a template from a platform templates datastore to improve a score associated with a job;
facilitating generation of a basic business model using a platform associated with the template;
determining if a venture can create an investment rate of return (IRR) that exceeds an IRR threshold;
based on the determination, generating a recommendation, by a processor, with respect to investment in the venture, the generation utilizing the platform associated with the template and the basic business model;
selecting a market using jobs data from a jobs and outcomes datastore.

9. The method of claim 8 further comprising capturing desired outcomes for jobs for use by a platform innovation engine with a target markets datastore.

10. The method of claim 8 further comprising storing the basic business model in a recommended business models datastore and using the basic business model from the recommended business models datastore.

11. The method of claim 8 further comprising adding features to the platform.

12. The method of claim 8 further comprising calculating fixed and variable costs of the venture.

13. The method of claim 8 further comprising quantifying the venture based on one or more of customer need scores, importance scores, and satisfaction scores.

14. The method of claim 8 further comprising:
storing the basic business model in a recommended business models datastore; and
using the basic business model from the recommended business models datastore.

15. A system comprising:
   means for adjusting parameters of a template from a platform templates datastore to improve a score associated with a job;
   means for facilitating generation of a basic business model using the platform associated with the template;
   means for determining if a venture can create an investment rate of return (IRR) that exceeds an IRR threshold;
   means for recommending, based on the means for determining, investment in the venture utilizing the platform associated with the template and the basic business model;
      means for selecting a market using jobs data from a jobs and outcomes datastore.

* * * * *